United States Patent
Fraley et al.

(10) Patent No.: US 9,435,819 B1
(45) Date of Patent: Sep. 6, 2016

(54) AUTONOMOUS TEMPERATURE ACCELEROMETER SENSOR

(71) Applicant: Arkansas Power Electronics International, Inc., Fayetteville, AR (US)

(72) Inventors: John Fraley, Fayetteville, AR (US); Bryon Western, West Fork, AR (US); Roberto Marcelo Schupbach, Fayetteville, AR (US)

(73) Assignee: Cree Fayetteville, Inc., Fayetteville, AR (US)

( * ) Notice: Subject to any disclaimer, the term of this patent is extended or adjusted under 35 U.S.C. 154(b) by 574 days.

(21) Appl. No.: 13/872,505

(22) Filed: Apr. 29, 2013

Related U.S. Application Data

(60) Provisional application No. 61/639,375, filed on Apr. 27, 2012.

(51) Int. Cl.
| | | |
|---|---|---|
| *G01M 13/04* | (2006.01) | |
| *G01P 1/00* | (2006.01) | |
| *G01H 1/00* | (2006.01) | |

(52) U.S. Cl.
CPC .............. *G01P 1/006* (2013.01); *G01H 1/006* (2013.01); *G01M 13/045* (2013.01)

(58) Field of Classification Search
CPC ..... G01H 1/006; G01M 13/045; G01P 1/006
USPC .......................................... 73/660; 340/870.16
See application file for complete search history.

(56) References Cited

U.S. PATENT DOCUMENTS

| | | | |
|---|---|---|---|
| 7,224,080 B2 | 5/2007 | Smedstad | 290/43 |
| 7,251,570 B2 | 7/2007 | Hancock et al. | 702/57 |
| 7,412,338 B2 | 8/2008 | Wynans et al. | 702/61 |
| 7,889,081 B2 | 2/2011 | MeTigue | 340/572.1 |
| 7,901,546 B2 | 3/2011 | Miller et al. | 204/196 |
| 8,050,875 B2 | 11/2011 | Karschnia | 702/51 |
| 2010/0019778 A1* | 1/2010 | Park | A61B 5/0031 324/652 |
| 2011/0016980 A1* | 1/2011 | Plavan | F16C 19/52 73/672 |
| 2012/0286935 A1* | 11/2012 | Huang | G01D 21/00 340/10.1 |

* cited by examiner

*Primary Examiner* — John Chapman, Jr.
(74) *Attorney, Agent, or Firm* — Baker & Hostetler LLP

(57) ABSTRACT

A turbine environment wireless transmitter for monitoring bearing health inside jet turbines. This transmitter has the ability to operate in 225 to 300 degree Celsius environments and monitor real time bearing temperature and vibration and transmit that data to a centralized system for processing. The system is powered by a built in thermal electric generator, which produces power in response to a thermal gradient across it. The information transmitted is used to monitor and diagnose a bearing operating parameters in real-time and predict a failure event before any damage occurs.

20 Claims, 3 Drawing Sheets

AUTONOMOUS TEMPERATURE ACCELEROMETER SENSOR

CROSS-REFERENCE TO RELATED APPLICATIONS

This application claims priority of U.S. Patent Application 61/639,375, filed Apr. 27, 2012 entitled AUTONOMOUS UPPER BIHECTO TEMPERATURE ACCELEROMETER SENSOR, which is hereby incorporated by reference in its entirety.

STATEMENT REGARDING FEDERALLY SPONSORED RESEARCH OR DEVELOPMENT

This invention was made with government support under grant FA8650-09-C-5202 awarded by the United States Air Force. The United States government has certain rights in the invention.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in monitoring operation and performance of machinery. The present invention is specifically directed to remote electronic monitoring of bearing operation in high temperature and/or inaccessible environments. High temperature means operating ranges above normal electrical component temperatures such as environments above 225 degrees Celsius and below 300 degrees Celsius, hereafter referred to as the upper bihecto temperature range. In particular, the present invention relates to an unwired bearing sensor including a power generator, temperature and/or vibration sensors, and a wireless transmitter operable in the upper bihecto range.

2. Description of the Known Art

As will be appreciated by those skilled in the art, sensors are known in various forms. Patents disclosing information uncovered include: U.S. Pat. No. 8,050,875, issued to Karschnia on Nov. 1, 2011 entitled Steam trap monitoring; U.S. Pat. No. 7,901,546, issued to Miller, et al. on Mar. 8, 2011, entitled Monitoring methods, systems and apparatus for validating the operation of a current interrupter used in cathodic protection; U.S. Pat. No. 7,889,081, issued to McTigue on Feb. 15, 2011 entitled Thermal radio frequency identification system and method; U.S. Pat. No. 7,412,338, issued to Wynans, et al. on Aug. 12, 2008 entitled Radio frequency device within an energy sensor system; U.S. Pat. No. 7,251,570, issued to Hancock, et al. on Jul. 31, 2007, entitled Data integrity in a mesh network; and U.S. Pat. No. 7,224,080, issued to Smedstad on May 29, 2007 entitled Subsea power supply. Each of these patents is hereby expressly incorporated by reference in their entirety.

From these prior references it may be seen that these prior art patents are very limited in their teaching and utilization, and an improved upper bihecto temperature range, wireless, temperature and/or vibration sensor is needed to overcome these limitations.

SUMMARY OF THE INVENTION

The present invention is directed to an improved autonomous sensor using high temperature components for operating in the upper bihecto range. In accordance with one exemplary embodiment of the present invention, an accelerometer is added for additional sensing. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
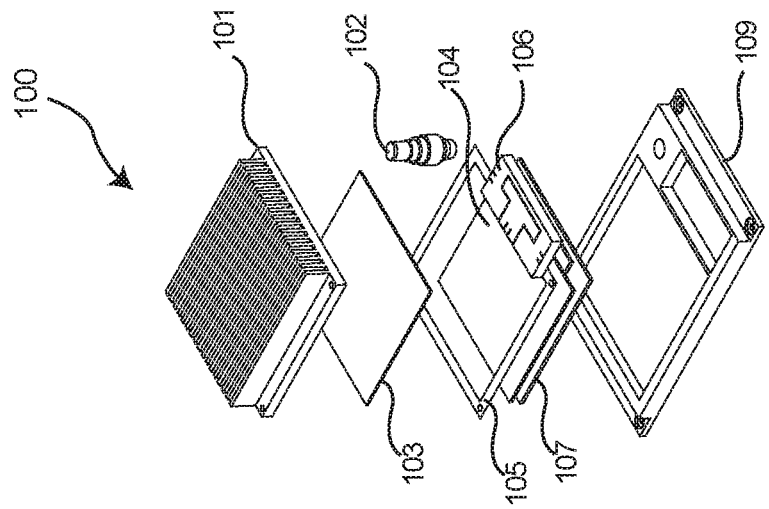
FIG. 1 is a perspective and exploded view of the autonomous sensor.
Figure 1:
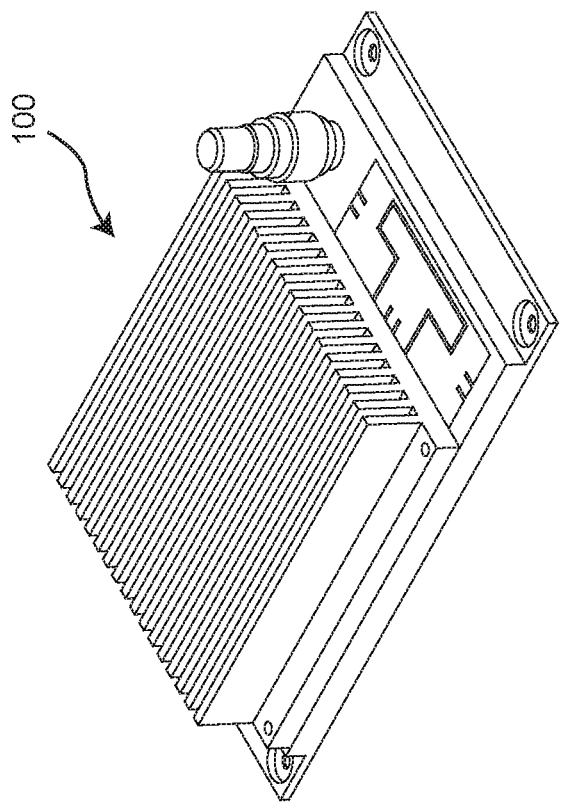

As shown in FIG. 1 of the drawings, one exemplary embodiment of the present invention is generally shown as an autonomous upper bihecto temperature accelerometer sensor system 100. This autonomous wireless sensor system 100 is a culmination of technologies developed and integrated into a miniaturized, fully autonomous drop-in wireless transmitter system 100. The invention includes novel approaches in the areas of both high temperature electrical circuit design as well as high temperature packaging. FIG. 1 shows a picture of the autonomous wireless sensor system 100 as a low profile layout. The system level approach to this invention was the design of sensors, electrical circuitry, and power source that could be integrated together and function at the elevated temperatures experienced inside a jet turbine bearing sump.

Specifically, the components included a heat sink 101, a piezoelectric accelerometer 102, a sealing lid 103, a thin-film thermal-electric generator, TEG 104, a window ring 105, wireless transmitter electrical circuitry 106, substrate 107, and baseplate 109.

The packaging for this system is designed around the reliable high temperature integration of the system and circuit components. The circuit packaging is based off of previous APEI, Inc. high temperature packaging technology utilizing low temperature co-fired ceramic, LTCC, technology. The substrate contains multiple mechanical and electrical layers, with multiple cavity structures to securely house the electrical components in a high vibration environment. The components are mechanically attached inside the cavities utilizing high temperature epoxies, such as ABLEBOND JM7000 for conductive attaches, while EPOTEK 353 ND is used for non-conductive attachment. Most electrical connections are made utilizing gold and aluminum wire bonds, on both active and passive components. The substrates are attached to a separate substrate baseplate via a high temperature thick film brazing system, such as the DUPONT 5081/5082 thick film braze system.

The heat sink 101 is placed on top of the TEG 104, and the heat sink is made from copper-tungsten for this prototype.

The piezoelectric accelerometer 102 is chosen to function at high temperatures and give a charge output proportional to the magnitude and frequency of bearing vibration.

Once the system is populated, the sealing lid 103 is seam sealed to the window ring 105, providing a seal to keep out oil and moisture that is encountered in the bearing sump.

The thin-film thermal-electric generator TEG 104 delivers an electrical power output in response to a thermal gradient across it.

A window ring 105 is attached to the top of the substrate 107.

The wireless transmitter electrical circuitry 106 serves to signal condition the accelerometer charge output, power condition the TEG output, and generate a wireless signal that contains vibration information from the accelerometer and internal temperature information of the electronics, and transmit that information to a remote location, such as an engine full authority digital engine control commonly referred to as a FADEC.

The substrate baseplate 107, window ring, 105 and lid 103 are all comprised of a low expansion alloy such as Kovar, which has a good CTE match to the ceramic substrate. The substrate baseplate 107 is then attached to the main baseplate 109 via bolts, and electrical connections to the sensor and TEG are made with high temperature solders, brazes, or welding processes.

The baseplate 109 upon which the TEG 104, the circuitry 106, and the sensors 102 are mounted is made from a high thermal conductivity alloy to allow good heat transfer through the TEG assembly. In the prototype system, this alloy is a copper-tungsten Metal Matrix Composite (MMC), but may be comprised of any other metal of good thermal conductivity. The baseplate 109 is machined with bolt holes which allow for secure attachment of the individual system components. The accelerometer 102 is attached by stud mounting it into one of the machined bolt holes.

Figure 2:
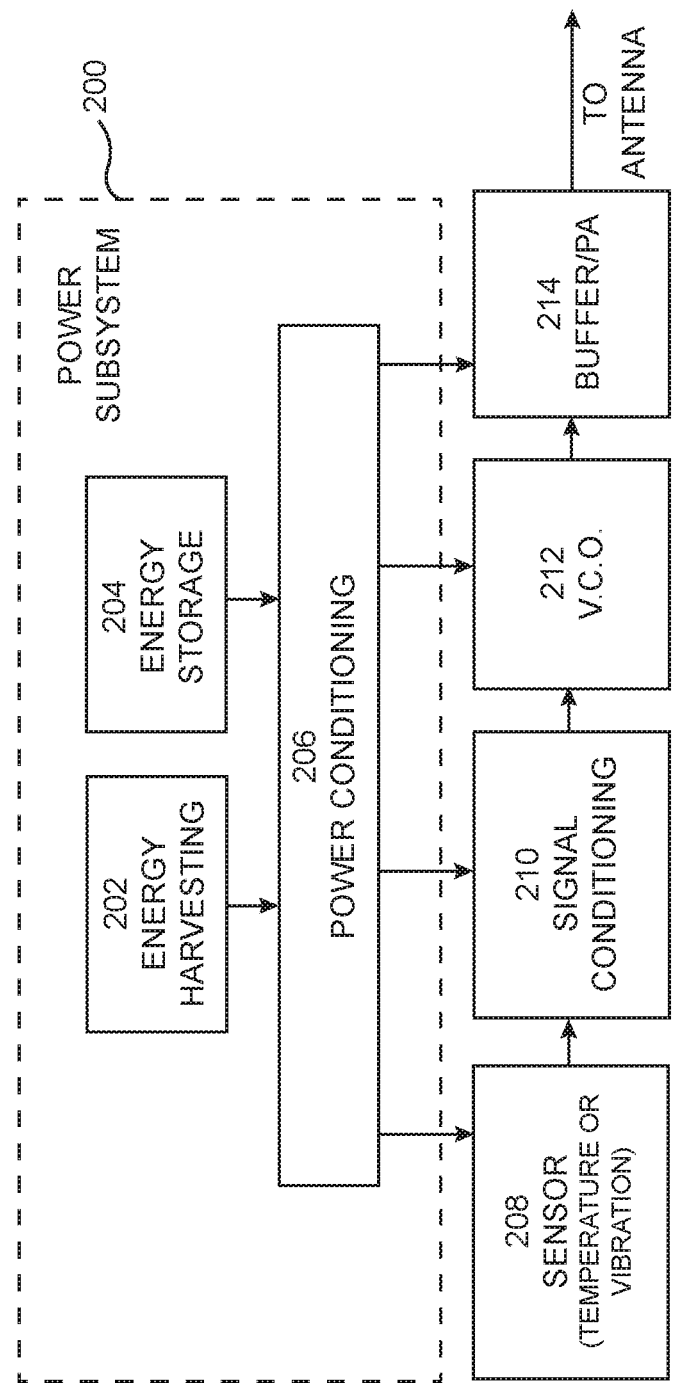
FIG. 2 is a system level diagram.

The system level blocks are depicted in FIG. 2. Beginning with the power subsystem 200, the energy harvesting component 202 is a Thermal Electric Generator or alternatively some other energy harvesting device, such as vibration or radio frequency energy harvester, the energy storage component 204 may be either a high temperature capacitor, a high temperature molten salt battery, or a high temperature thin film battery. The power conditioning electronics 206 may include rectifiers, boost or buck converters, voltage regulators, current regulators, and filtering. The sensor 208 may be any type of high temperature accelerometer, thermocouple, resistive temperature detector, strain gauge, flow rate sensor, or pressure sensor. The signal conditioning block 210 may include any high temperature capable circuitry that can convert a sensor output into a signal capable of modulating a wireless carrier signal. The voltage controlled oscillator VCO 212 and Buffer/Power Amplifier components 214 may include any high temperature circuitry capable of producing and modulating a wireless carrier signal.

Figure 3:
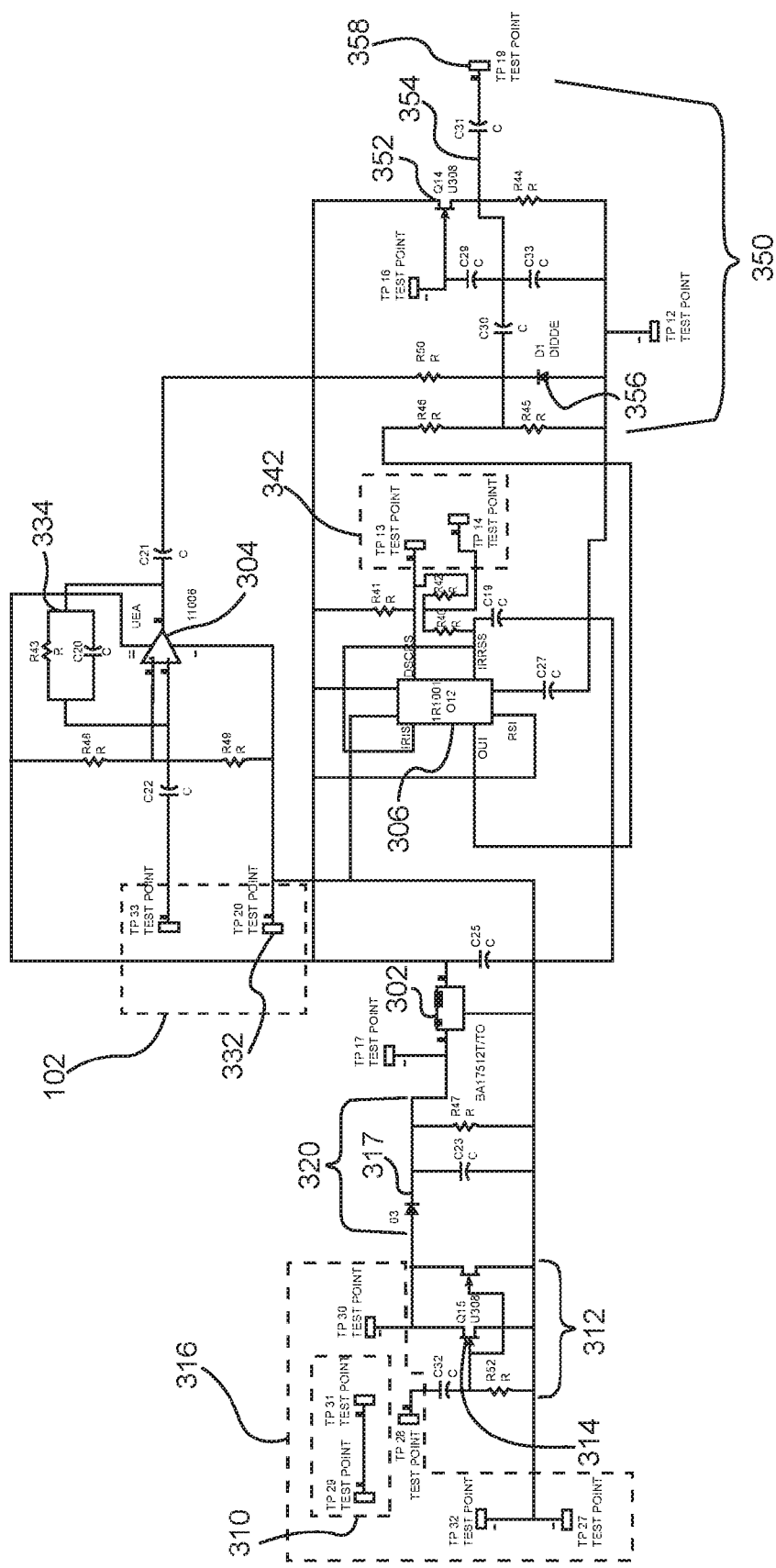
FIG. 3 is an electrical schematic of the sensor circuitry.

FIG. 3 shows the constructed embodiment of the circuitry 300 included in this invention which is comprised of components capable of high temperature operation, including transistors, diodes, resistors, capacitors, inductors, operational amplifiers, voltage regulators, timers, and varactors. In the prototype version of the system, the components included High Temperature Silicon on Insulator, HTSOI, integrated circuits, ICs, including a voltage regulator 302, an operational amplifier 304, and a 555 timer 306. Also included were thick film passives including ceramic resistors and capacitors. The transistors and diodes included silicon carbide, SiC, JFETs, PIN, and SBDs.

The circuitry used in the prototype can be seen in FIG. 3. In the prototype version of this invention, the electrical output 310 of the TEG 104 was converted from a low voltage output of 0.5 to 2 V into a 6 to 8 V power signal via a boost converter 312. The boost converter 312 utilizes a SiC JFET boost transistor 314 and a boost transformer 316 to function. The boost transistor 314 and boost transformer 316 are configured to self-oscillate at a very low voltage meaning less than >0.5 V providing the boost converter's own switching signal. The boosted power signal 317 is then delivered through a filter network 320 and a high temperature silicon on insulator voltage regulator 302 to deliver a regulated 5 V output to the signal conditioning 340 and radio frequency circuits 350.

In the prototype version of this invention, the accelerometer's charge output 332 is converted into a voltage output by using a high temperature silicon on insulator operational amplifier 304 and associated passives 334 in a charge amplifier configuration. This voltage is used as part of the modulating signal for the wireless carrier.

A 555 timer integrated circuit 306 is also configured as an astable multivibrator, with a temperature dependent resistor 342. In this way, the frequency of the timer output is made to vary with temperature. This information is also modulated onto the carrier by the radio frequency circuits 350. A silicon carbide JFET carrier transistor 352 is used to generate the RF carrier signal 354 by utilizing a Colpitts oscillator. One of the capacitors in the tank of the oscillator is constructed from a gallium nitride light emitting diode 356, as its capacitance can be made to vary with the voltage of the modulating signal. In this manner, the carrier signal 354 becomes frequency modulated. The frequency modulated carrier signal 354 is then broadcast to a remote receiver through a high temperature antenna 358.

The present invention discloses the development of extreme temperature, meaning up to 300° C., non-intrusive wireless sensor-transmitter suites using High-temperature Silicon on Insulator (HTSOI) electronics, and Silicon Carbide (SiC) electronics and the like, in conjunction with an innovative high-temperature packaging approach. This invention focuses on expanding new high-temperature wireless technology into a complete self-contained, self-powered wireless sensor-transmitter suite. The present invention has resulted in miniaturized and integrated technologies. This component will allow for a robust, reliable data transmitter that can operate in the bearing sump to deliver critical measurements such as temperature and vibration to the flight controller in real-time.

One application of this technology is integration into test engines for design validation. This allows engineers to receive data from test engines without the need to route wires, and the data is more accurate because the sensors can be located closer to the bearings and the signal integrity is not compromised due to noise picked up in the wiring. The system can be integrated into engines used in the field. This provides bearing health data that is superior to the current technology which detects metal particles in the oil stream. The early failure warning could save the lives of passengers and pilot, and it will prevent engine damage saving money on maintenance and lost equipment. In addition to the jet turbine market, there are several other markets that will benefit by the development of this technology. Electricity generation turbines can use this technology for compressor health monitoring. The technology can be modified to allow the industrial food processing industry to monitor the temperature of products while in a commercial oven. Additional sensors can be interfaced with the wireless transmitter to allow chemical processing industry to monitor their products while in production.

Reference numerals used throughout the detailed description and the drawings correspond to the following elements:
- autonomous wireless sensor system 100
- heat sink 101
- piezoelectric accelerometer 102
- sealing lid 103
- thin-film thermal-electric generator 104
- window ring 105
- wireless transmitter electrical circuitry 106
- substrate 107
- main baseplate 109
- high temperature power subsystem 200
- energy harvesting component 202
- energy storage component 204
- power conditioning electronics 206
- high temperature sensor 208
- signal conditioning block 210
- voltage controlled oscillator 212
- buffer power amplifier 214
- high temperature sensor circuitry 300
- voltage regulator 302
- operational amplifier 304
- timer 306
- TEG electrical output 310
- boost converter 312
- boost transistor 314
- boost transformer 316
- boosted power signal 317
- filter network 320
- accelerometer's charge output 332
- passive components 334
- signal conditioning circuit 340
- temperature dependent resistor 342
- radio frequency circuits 350
- carrier transistor 352
- carrier signal 354
- gallium nitride light emitting diode 356
- high temperature antenna 358

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A sensor apparatus configured to operate in a high temperature environment defined as being above two hundred and twenty five degrees celsius, the sensor apparatus comprising:
   a high temperature power subsystem including a high temperature energy harvesting component electrically connected to a high temperature energy storage component;
   high temperature power conditioning electronics connected to the high temperature power subsystem;
   a high temperature sensor connected to the high temperature power subsystem, the high temperature sensor generating a sensor output;
   a high temperature signal conditioning block connected to receive the sensor output and output a conditioned signal;
   a high temperature voltage controlled oscillator connected to receive the conditioned signal and output an oscillating signal, the high temperature voltage controlled oscillator being connected to and responsive to a temperature dependent component; and
   a high temperature amplifier connected to receive the oscillating signal and output a wireless signal to an antenna.

2. The apparatus of claim 1, wherein the energy harvesting component comprises a thermal electric generator.

3. The apparatus of claim 2, further comprising a transmitter configured to power condition an output of the thermal electric generator.

4. The apparatus of claim 1, wherein the energy storage component comprises a capacitor with an operating range above two hundred and twenty five degrees celsius.

5. The apparatus of claim 1, wherein the sensor Comprises a high temperature accelerometer.

6. The apparatus of claim 5, further comprising a transmitter configured to signal condition a charge output of the high temperature accelerometer.

7. The apparatus of claim 6, wherein the transmitter is further configured to generate a wireless signal with vibration information and to transmit the wireless signal to a remote location.

8. The apparatus of claim 1, wherein the high temperature signal conditioning block comprises a silicon on insulator operational amplifier.

9. The apparatus of claim 1, wherein the temperature dependent component comprises a gallium nitride light emitting diode.

10. The apparatus of claim 1, wherein the high temperature amplifier comprises a silicon carbide junction gate field-effect transistor.

11. The apparatus of claim 1, further comprising a window ring and a substrate baseplate, the window ring being attached to a top portion of the substrate baseplate.

12. The apparatus of claim 11, wherein the substrate baseplate is attached to a main baseplate.

13. The apparatus of claim 12, further comprising a sealing lid which is seam sealed to the window ring.

14. The apparatus of claim 13, wherein the window ring and the sealing lid are made of Kovar, and wherein the substrate baseplate is made of a copper-tungsten alloy.

15. The apparatus of claim 1, further comprising a JFET carrier transistor to generate a radiofrequency carrier signal using a Colpitts oscillator.

16. A sensor apparatus configured to operate in a high temperature environment defined as being above two hundred and twenty five degrees celsius, the sensor apparatus comprising:
 a high temperature power subsystem including a high temperature energy harvesting component electrically connected to a high temperature energy storage component;
 high temperature power conditioning electronics connected to the high temperature power subsystem;
 a high temperature sensor connected to the high temperature power subsystem, the high temperature sensor generating a sensor output;
 a high temperature signal conditioning block connected to receive the sensor output and output a conditioned signal;
 a high temperature voltage controlled oscillator connected to receive the conditioned signal and output an oscillating signal, the high temperature voltage controlled oscillator comprising a 555 timer integrated circuit connected to a temperature dependent component; and
 a high temperature amplifier connected to receive the oscillating signal and output a wireless signal to an antenna.

17. A sensor apparatus configured to operate in a high temperature environment defined as being above two hundred and twenty five degrees celsius, the sensor apparatus comprising:
 a high temperature power subsystem including a high temperature energy harvesting component electrically connected to a high temperature energy storage component;
 high temperature power conditioning electronics connected to the high temperature power subsystem;
 a high temperature sensor connected to the high temperature power subsystem, the high temperature sensor generating a sensor output;
 a high temperature signal conditioning block connected to receive the sensor output and output a conditioned signal;
 a high temperature voltage controlled oscillator connected to receive the conditioned signal and output an oscillating signal, the high temperature voltage controlled oscillator comprising an integrated timer circuit connected to and responsive to a temperature dependent component; and
 a high temperature amplifier connected to receive the oscillating signal and output a wireless signal to an antenna.

18. The apparatus of claim 17, wherein the energy harvesting component comprises a thermal electric generator.

19. The apparatus of claim 17, wherein the sensor comprises a high temperature accelerometer, and wherein the high temperature signal conditioning block comprises a silicon on insulator operational amplifier.

20. The apparatus of claim 17, wherein the temperature dependent component is a temperature dependent resistor configured to vary a frequency of an output of the integrated timer circuit with temperature.

* * * * *